UNITED STATES PATENT OFFICE.

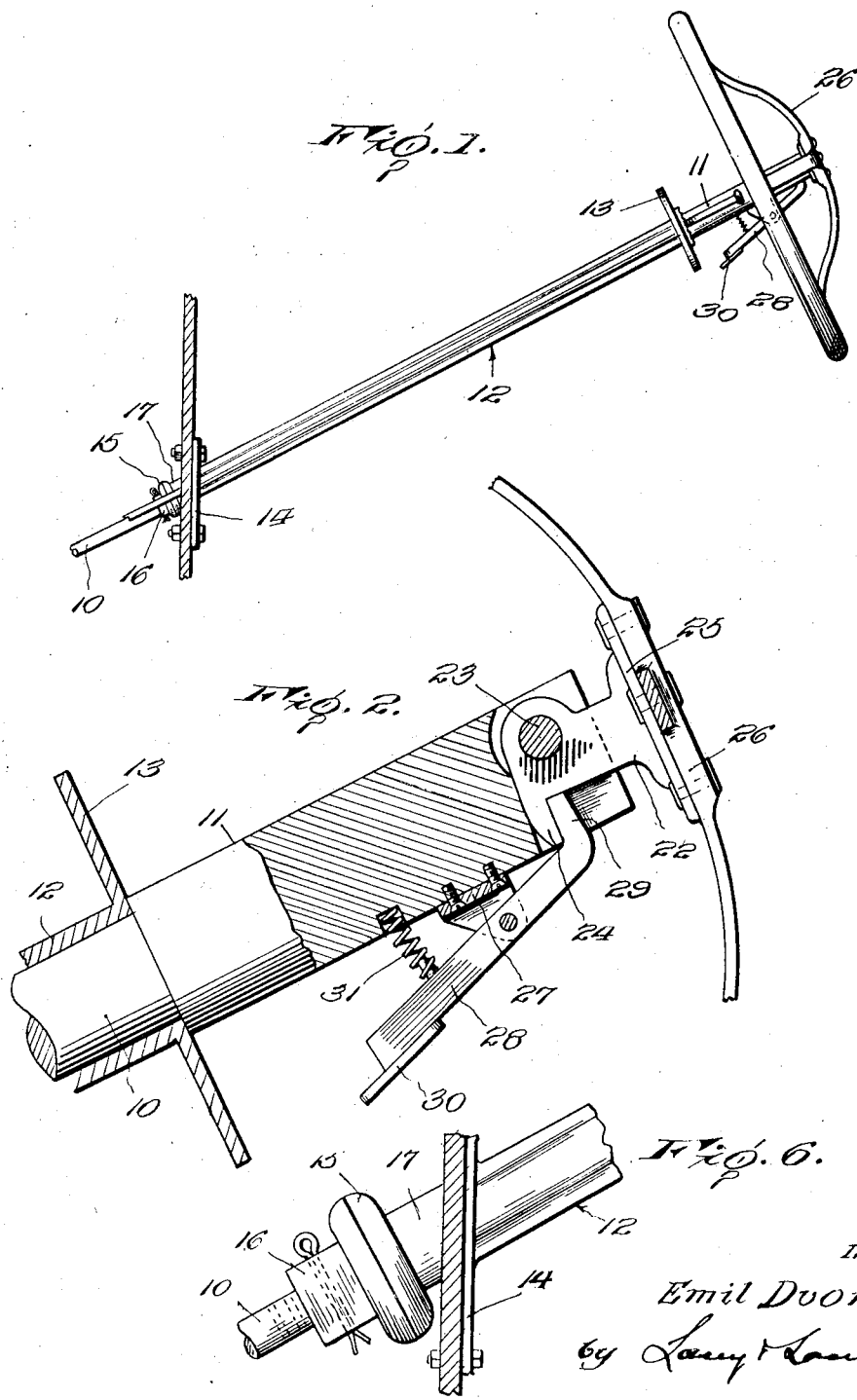

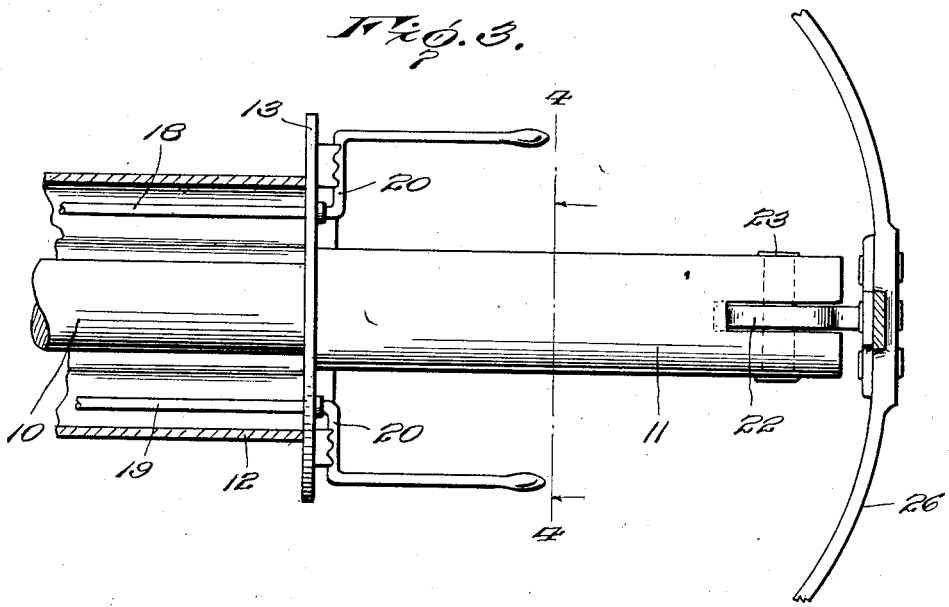
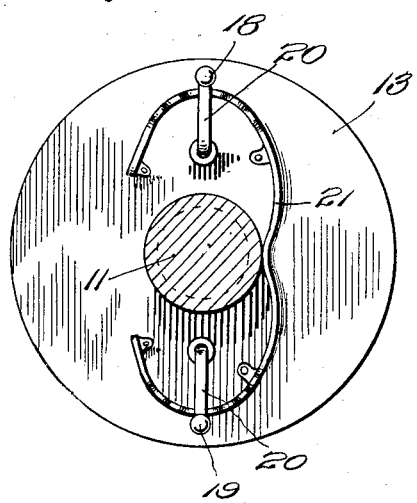
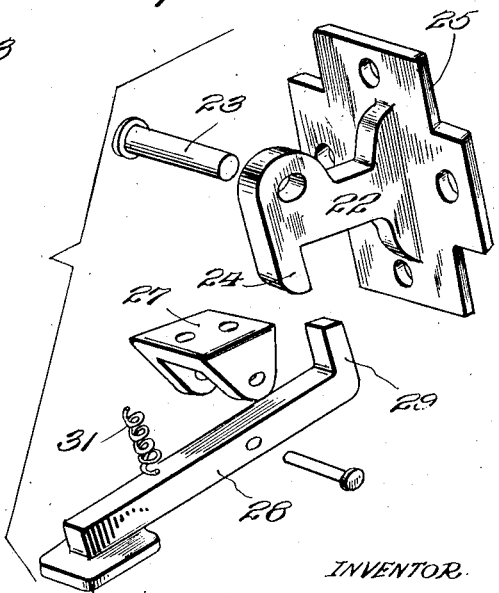

EMIL DVORAK, OF OCHEYEDAN, IOWA.

STEERING COLUMN AND WHEEL.

1,330,178.  Specification of Letters Patent.  Patented Feb. 10, 1920.

Application filed April 1, 1919. Serial No. 286,645.

*To all whom it may concern:*

Be it known that I, EMIL DVORAK, citizen of the United States, residing at Ocheyedan, in the county of Osceola and State of Iowa, have invented certain new and useful Improvements in Steering Columns and Wheels, of which the following is a specification.

This invention relates to an improved steering column and wheel for motor vehicles and has as its primary object to provide a construction wherein the steering wheel may be folded or shifted upwardly to a position out of the way to thus provide ample clearance between the upper end of the steering column and the driver's seat so that the driver may readily move behind the column into or out of said seat.

The invention has as a further object to provide a construction wherein the steering wheel will be normally locked in active position but wherein said wheel may, when desired, be readily released and swung to inactive position.

And the invention has as a still further object to provide a steering column and wheel which will be well adapted for general use.

Other and incidental objects will appear hereinafter. In the drawings:

Figure 1 is a fragmentary side elevation of my improved steering column and wheel, Fig. 2 is a fragmentary sectional view showing the steering wheel locked in active position upon the steering column.

Fig. 3 is a fragmentary plan view particularly illustrating the arrangement of the throttle and spark rods at opposite sides of the steering column, Fig. 4 is a transverse sectional view taken on the line 4—4 of Fig. 3 and looking in the direction of the arrows, Fig. 5 is a detail perspective view showing the latch and associated parts employed in connection with the steering wheel mounting, the several elements being disassembled.

Fig. 6 is a fragmentary elevation showing the bearing employed for rotatably supporting the steering rod.

In carrying the invention into effect, I employ a steering rod 10 provided at its upper end with an enlarged head 11. Surrounding the upper portion of the steering rod and abutting at its upper end against the shoulder at the inner end of the head, is a casing 12 formed at its upper end with an annular flange 13. At its lower end the casing is integrally formed with or otherwise secured to a dash plate 14. This plate is, as suggested in Fig. 1, of the drawings, adapted to be secured in any approved manner to a vehicle dash for bracing the steering column with respect thereto. Supporting the steering rod to freely turn within the casing 12 is a roller bearing 15 of approved type. This roller bearing surrounds the rod and is held between a nut 16 upon the rod and a washer 17 abutting the vehicle dash. The nut is adjustable for taking up longitudinal play in the steering rod and is locked in adjusted position by a suitable cotter pin. Journaled through the flange 13 of the casing at opposite sides of said casing, are throttle and control rods 18 and 19 respectively. Immediately above the flange 13 of the casing these rods are provided with offset portions 20 coacting with a quadrant 21', upon the flange.

At its upper end, the head 11 of the steering rod 10 is provided with a transverse slot 21 and pivotally mounted within this slot is a hinge member 22. This hinge member is supported by a pivot pin 23 extending transversely through the head and formed on said member at its lower edge is a lateral lug 24 at the inner end of the member. At its outer end, the hinge member is provided with a head plate 25 and mounted upon this plate is a steering wheel 26, the inner end portions of the spokes of which are riveted or otherwise secured to the plate. Screwed or otherwise secured to the head 11 in alinement with the slot 21 is a bracket 27 and pivoted upon this bracket is a latch 28. At its upper end the latch is provided with a laterally directed lug 29 adapted to extend into the slot 21 and, as shown in Fig. 2, engage over the lug 24 of the hinge member 22. Formed on the lower end of said latch is a thumb plate 30 and bearing between the latch and the head 11 of the steering rod is a spring 31 normally holding the latch coacting with the hinge member.

As will now be clear, the latch 28 will normally coact with the hinge member 22 to retain this hinge member within the slot 21 of the head 11 of the steering rod and lock the steering wheel in active position. Consequently, the steering wheel may be rotated in the usual manner for turning the steering rod. However, when it is desired by a driver to get into or out of a vehicle equipped with my improved steering column and wheel, the latch may be depressed at its lower end to free the hinge member 22 so that the steering wheel may thus be swung upwardly to inactive position out of the way. As illustrated in Fig. 2, the lugs 24 and 29 have their opposed faces extending at right angles to the longitudinal axis of the steering column so as to prevent the pivotal movement of the steering wheel prior to releasing the latch 28. Since the under side of the lug 24 is in contact with the bottom wall of the slot and the upper side of the same is flatly in contact with the lug 29, accidental movement of the steering about the axis of the pivot 23 is eliminated. In other words, the operating or rear portion of the latch 28 must be manually pressed inwardly toward the steering column in order to release the steering wheel when it is desired to move the same on its pivot to an inoperative position. This construction eliminates the possibility of the operator of the vehicle pressing down on one side of the steering wheel and accidentally moving the steering wheel to an inoperative position when the vehicle is in motion. Ample clearance will thus be provided between the upper end of the steering column and the driver's seat so that the driver may move into or out of said seat with ease. I accordingly provide a particularly effective construction for the purpose set forth while, at the same time, the construction is such that the steering column and wheel may be readily installed upon different types of vehicle.

As illustrated in Fig. 2, the underside of the lug 24 is held flatly in contact with the bottom wall of the slot by the inwardly directed lug 29 of the latch 28, whereby the steering wheel is held rigidly in position.

Having thus described the invention, what is claimed as new is:

1. The combination with a steering rod having a transverse slot, of a hinge plate having a shank pivoted within said slot and provided with a laterally projecting lug flatly in contact with the bottom wall of the slot, a steering wheel attached to said hinge plate, a bracket carried by the steering rod, a latch pivoted intermediate its ends to said bracket, the upper portion of said latch being extended inwardly to form a lug adapted for engaging said first named lug; said first and second named lugs having their opposed faces extending at right angles to the axis of the steering rod when the steering wheel is in an operative position, and a coil spring confined between the rear portion of said latch and the adjacent portion of the steering rod for pressing the lug of the latch inwardly.

2. The combination with a steering rod having a transverse slot, of a hinge plate having a shank pivoted within said slot, a steering wheel on said hinge plate, a laterally extending lug carried by the inner end of said shank and flatly in contact with the bottom wall of said slot when the steering wheel is in an operative position, a latch extending longitudinally of the steering rod and pivoted intermediate its ends at one side of the steering rod for providing an operating portion at its rear end, an inwardly extending lug carried by the upper end of said latch and adapted to engage the upper side of the lug of said shank, and spring means engaged with the rear portion of said latch for securing said first and second named lugs in engagement.

In testimony whereof I affix by signature,

EMIL DVORAK. [L. S.]